US006999077B2

(12) United States Patent
Hung et al.

(10) Patent No.: US 6,999,077 B2
(45) Date of Patent: *Feb. 14, 2006

(54) Z-BUFFER BASED INTERPENETRATING OBJECT DETECTION FOR ANTIALIASING

(75) Inventors: Daniel Hung, Santa Clara, CA (US); Eric Young, San Jose, CA (US); Roger Swanson, Santa Clara, CA (US)

(73) Assignee: S3 Graphics Co., Ltd., Grand Caymans (KN)

( * ) Notice: Subject to any disclaimer, the term of this patent is extended or adjusted under 35 U.S.C. 154(b) by 0 days.

This patent is subject to a terminal disclaimer.

(21) Appl. No.: 10/855,992

(22) Filed: May 26, 2004

(65) Prior Publication Data

US 2005/0007363 A1 Jan. 13, 2005

Related U.S. Application Data

(63) Continuation of application No. 09/111,492, filed on Jul. 7, 1998, now Pat. No. 6,760,025.

(51) Int. Cl.
*G06T 15/40* (2006.01)

(52) U.S. Cl. .......................................................... 345/422

(58) Field of Classification Search ................. 345/419, 345/420, 421, 422, 423, 424, 426, 427, 428, 345/589, 611, 612, 613, 614, 619, 673, 958

See application file for complete search history.

(56) References Cited

U.S. PATENT DOCUMENTS

| | | | |
|---|---|---|---|
| 4,590,465 | A | 5/1986 | Fuchs |
| 4,783,649 | A | 11/1988 | Fuchs et al. |
| 4,825,391 | A | 4/1989 | Merz |
| 4,827,445 | A | 5/1989 | Fuchs |
| 5,153,937 | A | 10/1992 | Wobermin et al. |
| 5,509,110 | A | 4/1996 | Latham |
| 5,561,750 | A | 10/1996 | Lentz |
| 5,583,974 | A | 12/1996 | Winner et al. |
| 5,594,854 | A | 1/1997 | Baldwin et al. |
| 5,740,345 | A | 4/1998 | Danielson et al. |
| 5,872,902 | A | 2/1999 | Kuohkuda et al. |
| 5,977,987 | A | 11/1999 | Duluk, Jr. |
| 5,990,904 | A | 11/1999 | Griffin |
| 6,760,025 | B1 | 7/2004 | Hung et al. |

OTHER PUBLICATIONS

Schilling et al., "A New Simple and Efficient Antialissing with Subptxel Masks," ACM–0–89791–4S8–8/91/007/0133, 1991.

*Primary Examiner*—Kee M. Tung
*Assistant Examiner*—Enrique L. Santiago
(74) *Attorney, Agent, or Firm*—Carr & Ferrell LLP

(57) ABSTRACT

Graphic processor compares z-buffer values of 3D objects to detect and mark interpenetrating pixels. Tag buffer stores marked values for antialiasing effectively by over-sampling, area-based, blending, alpha edge or other pixel-processing scheme. Performance is improved by selectively antialiasing at edges and/or interpenetrations. Cost is reduced by leveraging z-buffer storage therefor. Super-sampling antialiasing reduces sampling of select interpenetration elements, thereby avoiding processing entire image.

16 Claims, 4 Drawing Sheets

64

```
// Phase I
// do z-buffer update and tag interpenetration pixels at the same time
void processZBufferAndTagBuffer(
        xS,                 // xS = x screen coordinate of pixel [input]
        yS,                 // yS = y screen coordinate of pixel [input]
        v,                  // zBuf[xS][yS] = z buffer value at location (xS,yS) [input]
        zBuf,               // tagBuf[xS][yS] = tag buffer value at location (xS,yS)
                            // [input / output]
        tagBuf)             // v[i] = ith vertex of the triangle [input / output]
{
    // interpolate the z value of this pixel on the triangle from the
    // vertices of the triangle.
    zS = computeZ(xS,yS,v);

    // assume the bigger the z value, the further away it is, so z-buffer
    // contains the nearest z values so far
    if ( bigger(zBuf[xS][yS],zS) ) {
        // update z buffer if current pixel's z is closer than the
        // corresponding value in z-buffer
        updateZBuf(zBuf[xS][yS],zS);
    }
    else if ( equal(zBuf[xS][yS],zS) ) {
        // update tag buffer if current pixel's z indicate that there is
        // interpenetration at this pixel
        updateTagBuf(tagBuf[xS][yS]);
    }
}
```

66

```
// Phase II
// shade a pixel and do anti-aliasing (via oversampling) on that pixel if necessary
void doShadingAndAntiAliasing(
        xS,                 // xS = x screen coordinate of pixel [input]
        yS,                 // yS = y screen coordinate of pixel [input]
        v,                  // zBuf[xS][yS] = z buffer value at location (xS,yS)
                            // [input]
        texture,            // texture = texture
        tagBuf,             // v[i] = ith vertex of the triangle [input]
        overCache,          // overCache = oversampling cache [input / output]
        destBuf)            // destBuf[xS][yS] = destination buffer at location
                            // (xS,yS) [output]
{
    if ( tagged(tagBuf[xS][yS]) ) {
        // oversample if pixel is tagged for oversampling
        oversampledPixel = oversample(xS,yS,v,texture);
        if ( hasSample(xS,yS,overCache) ) {
            // has previous oversampling stored, so blend and output result to
            // destination
            destinationPixel = blend(overCache,oversampledPixel);
            destBuf[xS][yS] = destiantionPixel;
        }
        else {
            // otherwise, just store oversampling result to oversampling cache
            update(xS,yS,overCache,currentPixel);
        }
    }
    else {
        // if no over sampling needed, just do normal processing
        destBuf[xS][yS] = normalsample(xS,yS,v,texture);
    }
}
```

FIG. 4

Z-BUFFER BASED INTERPENETRATING OBJECT DETECTION FOR ANTIALIASING

CROSS-REFERENCE TO RELATED APPLICATION

This application is a continuation of and claims the priority benefit of U.S. patent application Ser. No. 09/111,492 entitled "Z-Buffer Based Interpenetrating Object Detection for Antialiasing" filed Jul. 7, 1998 now U.S. patent No. 6,760,025, the disclosure of this commonly owned and assigned application is incorporated herein by reference.

FIELD OF INVENTION

The invention relates to computer graphics, particularly to antialiasing technique and mechanism for three-dimensional object representations.

BACKGROUND OF INVENTION

In computer-based graphics display processing, antialiasing techniques are used generally to remove or reduce jagged edges from characters, lines and objects. Typically, antialiasing is applied to eliminate visibly jagged effects, particularly arising from diagonally drawn edges. In the case of graphics processing of three-dimensional (3D) objects, antialiasing also is used to de-jag edges of 3D objects.

However, in such 3D cases, antialiasing conventionally is applied either: to known object edges, typically edges of 3D primitives such as triangles, without regard to selecting or processing certain graphic content or conditions, such as when 3D object surfaces apparently interpenetrate or intersect in space; or to an entire object. In the case of antialiasing only known object edges, graphics contents or conditions, such as edges generated when 3D objects apparently interpenetrate or intersect in space, are not antialiased. In the case where anti-aliasing is applied for entire object, conventional antialiasing techniques for 3D object requires significant buffer or other hardware usage and results in decreased processing performance.

Accordingly, there is a need for an improved antialiasing scheme and system for processing interpenetrating 3D objects.

SUMMARY OF INVENTION

The invention resides in a graphic processing system which compares z-buffer values of 3D objects to detect interpenetration. Pixels corresponding to objects with substantially same z-buffer values are marked as interpenetrating in a tag buffer memory for antialiasing. The preferred antialiasing scheme may include over-sampling, area-based, blending, alpha edge or similar technique.

Thus, antialiasing of 3D object interpenetration in computer graphics improves performance and reduces hardware/software cost. Z-buffer construct or other storage facilitates interpenetration antialiasing, particularly through early detection. Preferably, over- or super-sampling antialiasing provides reduced sampling of select interpenetration elements, without processing entire image output or display signal. Performance and implementation is improved by processing only at edges and/or interpenetrations.

BRIEF DESCRIPTION OF DRAWINGS

FIG. 4 is a representative pseudo-code for implementing the functionality of FIGS. 2A–B.

DETAILED DESCRIPTION

Figure 1:
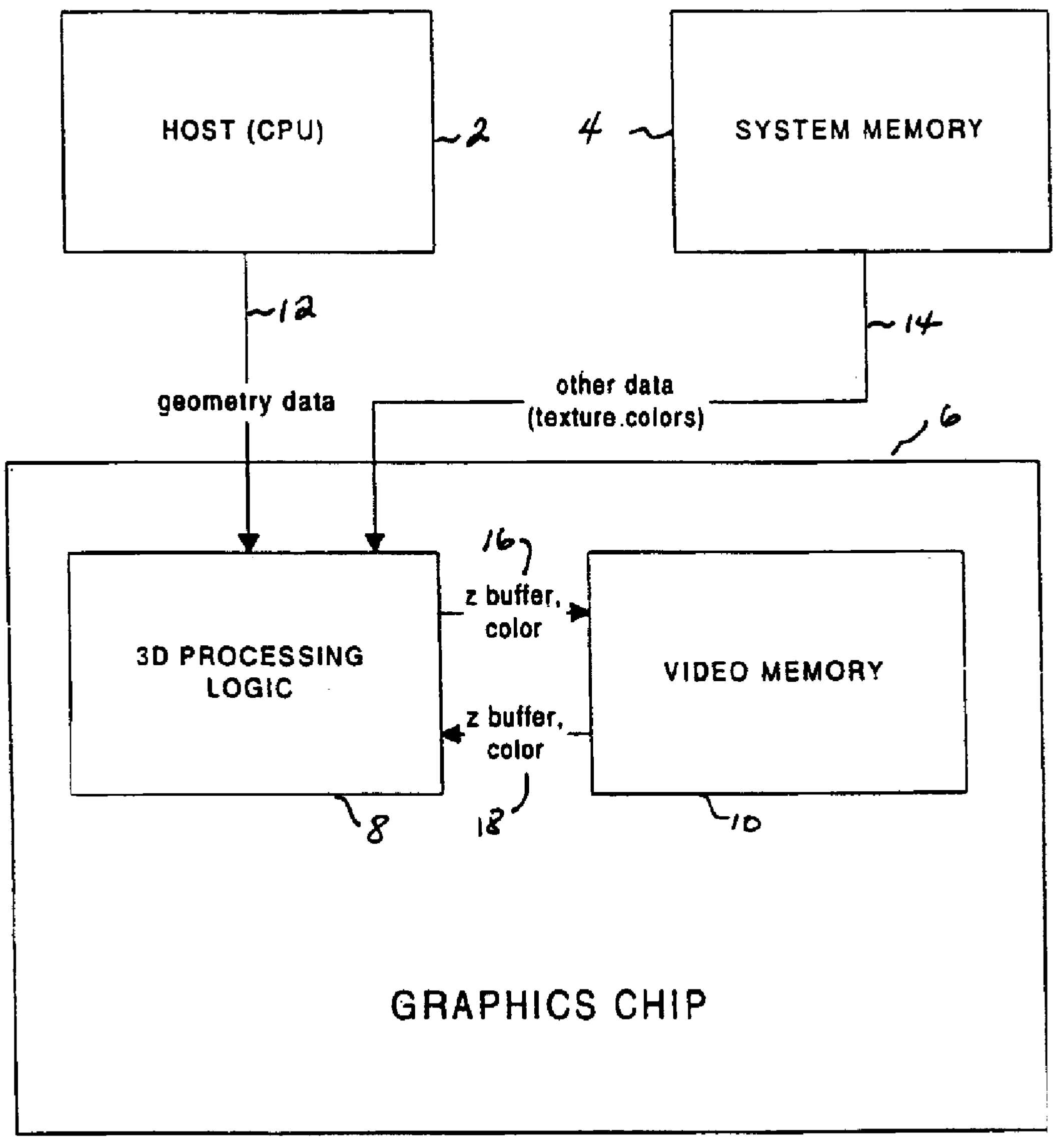
FIG. 1 is a graphics system diagram for implementing the present invention.

FIG. 1 is a graphics processing system including a central controller, a microprocessor, or a host processor 2, a digital storage 4 coupled 12, 14 to a graphics processor 6, which includes a 3D processing logic 8 and a video memory or a frame buffer 10, wherein z-buffer and color information is transferred 16, 18 therebetween.

Processor 2 may be implemented using one or more conventional or proprietary microprocessors or functionally equivalent processing devices, as configured to operate substantially according to the present invention. Storage 4 may be implemented using one or more conventional or proprietary digital memories or functionally equivalent storage devices as configured to operate substantially according to the present invention. Graphics processor 6 may be implemented using one or more conventional or proprietary graphics processors or functionally equivalent display processing devices, as configured to operate substantially according to the present invention. It is contemplated herein that the present innovation may be implemented functionally in equivalent electronic hardware, firmware, and/or software.

In accordance with an important aspect of the invention, processor logic 8 processes one or more z-buffer values associated with one or more 3D object representations provided as geometric data 12 from host processor source 2, other data, such as texture, colors, from memory 4, or z-buffer, color information from memory 10.

Apparent or effective interpenetration, intersection or overlapping pixel location, or graphical condition, state or event is signal-processed. For example, such signal processing may effectively achieve interpenetration detection, observation, monitoring, recognition, or other identification scheme. Preferably, such signal processing determines by comparing or calculating z-buffer values between subject or candidate 3D objects for 2D screen display.

In particular, such interpenetration is determined when two or more such processed 3D object representations are accordingly processed to detect z-buffer values which are the same, substantially similar, essentially equivalent, or otherwise within specified value or percentage range, margin, tolerance, or zone. Preferably, interpenetration determination may be achieved by other functionally equivalent technique or circuit, for example, for indicating, flagging, marking, or tagging specified interpenetration conditions.

Preferably, a tag buffer, cache or other digital storage such as memory 4, 10 serves to hold such z-buffer values and/or corresponding pixel locations (e.g., one marked bit per screen element) currently determined to represent effective or apparent interpenetration between 3D objects.

Moreover, antialiasing or other functionally comparable or equivalent de-jagging graphics signal processing techniques may be applied selectively to such tagged z-buffer, pixel, or other associated interpenetrating locations. For example, contemplated de-jagging techniques include over-sampling, area-based, blending, alpha edge or other similar or comparable pixel-processing scheme.

Hence, according to a general objective of the present invention, antialiasing of interpenetration of 3D objects in computer graphics is achieved with improved performance and reduced hardware/software cost. Such advantage is accomplished preferably by using a z-buffer construct or equivalent storage means available in other conventional 3D graphics hardware implementations. However, the present innovation leverages such z-buffer construct for interpenetration detection and antialiasing.

Effectively by early interpenetration detection, the present innovation may use an antialiasing scheme, such as over- or super-sampling, for example, by taking additional reduced number of samples on select interpenetration elements, without sampling the entire image output or display signal. Accordingly, improved performance and implementation is achieved by processing only at edges and/or interpenetrations.

Figure 2A:
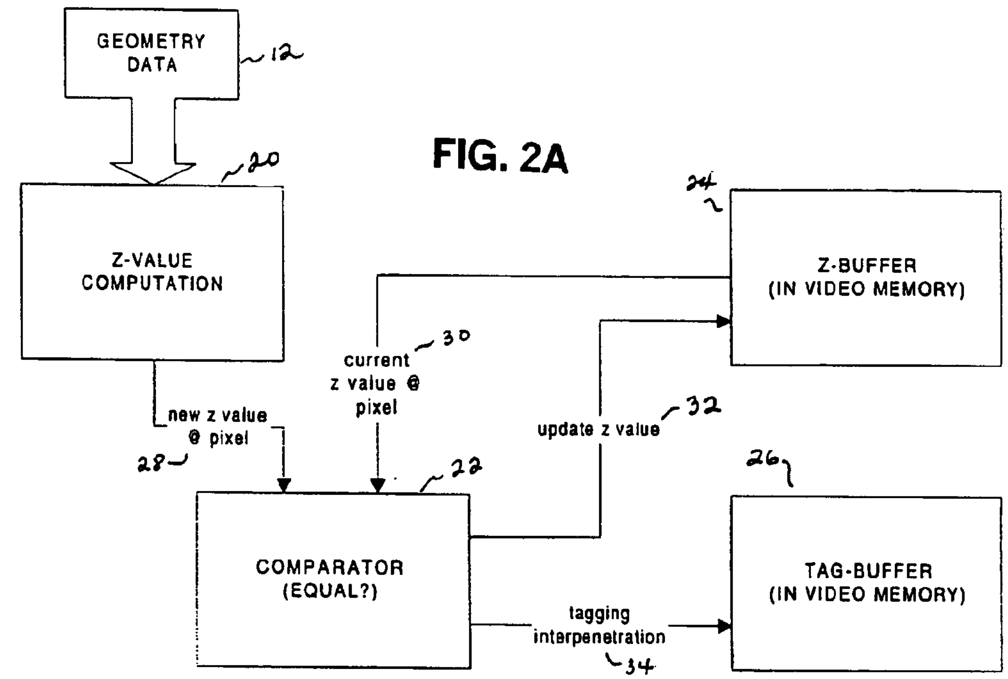
FIG. 2A is a diagram of triangle interpenetration aspect of the present invention.

FIG. 2A illustrates the present interpenetration detection scheme. Initially, geometric data 12, including object triangle vertices, received by 3D processing logic 8 from host central processor 2, are provided as input graphics signal representing one or more multi-dimensional objects for pre-display processing according to the present invention. Logic 8 performs z-value computation 20 to determine one or more z-values 28 associated with one or more pixels associated with one or more objects currently being processed according to input signal. Z-value computation 20 may interpolate the z-values for triangles for each pixel being processed.

Comparator 22 receives a new z-value per pixel 28, as well as fetches the current or previously-stored z-value per pixel 30 from the z-buffer 24 in video memory 10. Comparator 22 functions or includes processing logic to compare, measure, test, or otherwise determine whether a new z-value 28 and the current or prior z-value 30 are equal, substantially the same, essentially similar, or otherwise within a specified range of value or tolerance, thereby effectively triggering interpenetration detection. To maintain the most-recent historical z-values 30, comparator 22 applies a new z-value to update the z-value 32 for storage in z-buffer 24.

In particular, when comparator 22 detects an interpenetration condition or event, as described further herein, the new z-value or other signal associated with interpenetration condition is tagged, marked, or otherwise identified and provided 34 in tag buffer, cache, or other equivalent storage 26 in video memory 10.

Figure 2B:
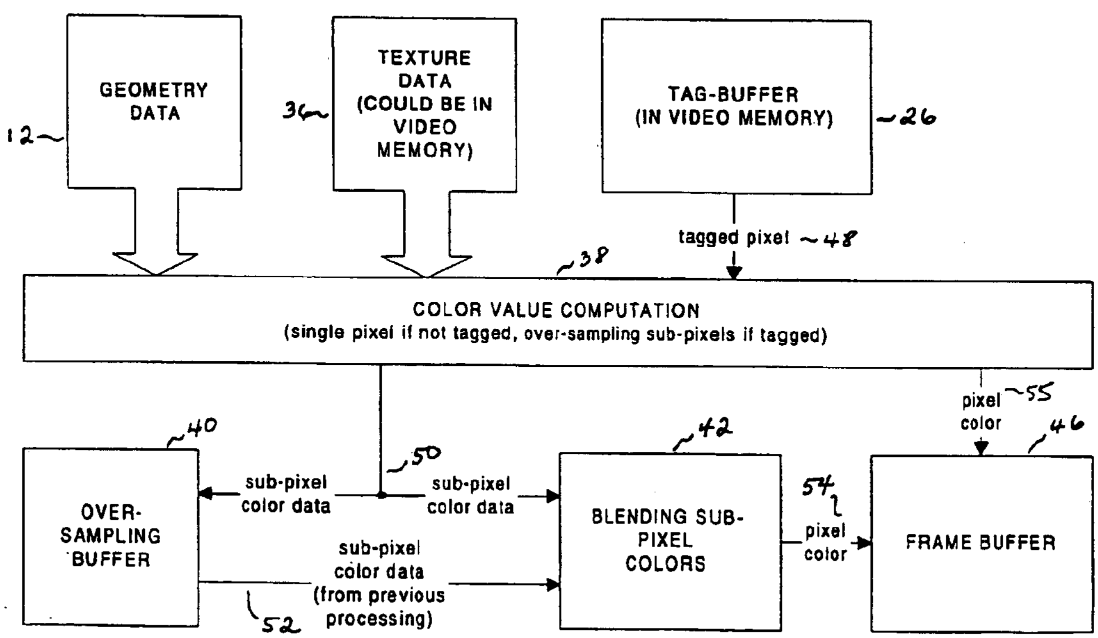
FIG. 2B is a diagram of over-sampling on tagged pixels for antialiasing according to one embodiment of the present invention.

FIG. 2B illustrates an over-sampling scheme for antialiasing tagged pixels. It is contemplated that various antialiasing or dejagging techniques may be applied according to the present invention.

Here, over-sampling antialiasing approach is performed on tagged pixel information or signal 48 obtained from tag buffer 26 in video memory 10. Color-value computation is performed by processor logic 8 using tagged pixel signal 48, texture data 36 from video memory 10, and geometry data 12 from host processor 2. Color-value computation 38 may be single-pixel if not tagged, or over-sampling sub-pixels if tagged.

As shown, sub-pixel color data signal 50 is processed for over-sampling buffer 40 and/or blending sub-pixel color functional block 42. Preferably, such processing may generally include application, switching, multiplexing, or otherwise selective connection of signal 50 for processing thereof. Additionally, sub-pixel color data signal from prior processing cycle or sample is applied 52 from over-sampling buffer 40 to block 42. Pixel color signal 54, 55 is applied to frame buffer 46 from block 42 and color value computation 38.

Preferably, pixel color signal 55 is applied for non-oversampled pixels, and pixel color signal 54 is applied for oversampled pixels. Note that, in the initial sampling cycle, over-sampling buffer 40 merely stores a value, without such blending processing, which starts in the next sampling cycle.

Figure 3:
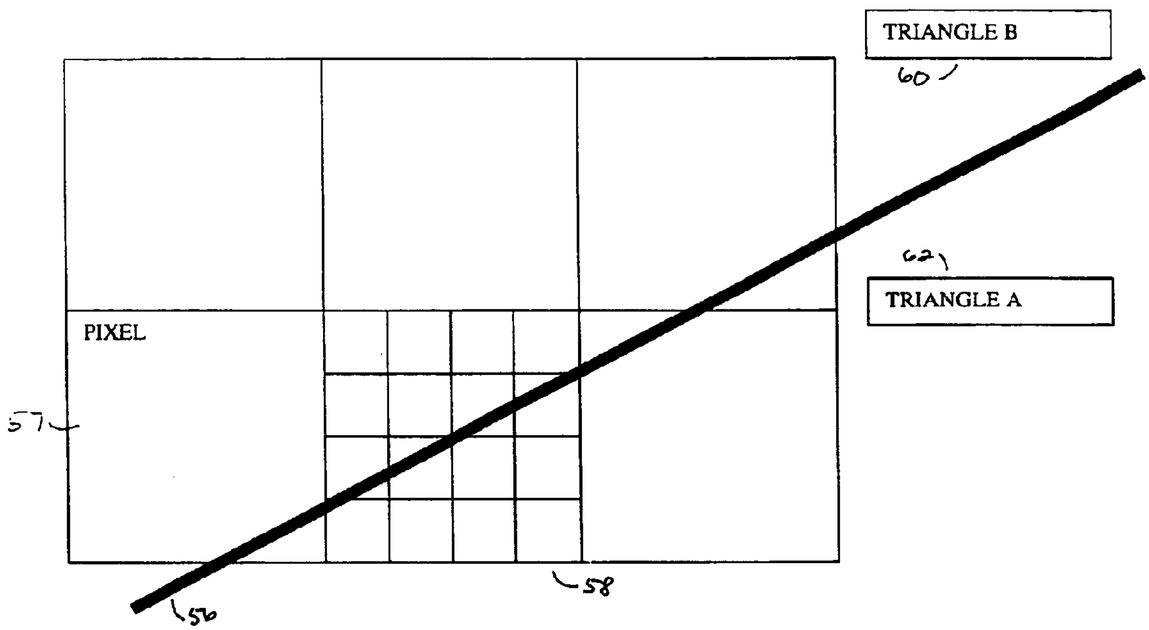
FIG. 3 is a diagram illustrating over-sampling according to the present invention.

FIG. 3 is illustrates the sample pixel 57 and over-sampled sub-pixels 58 for finer edge steps per the antialiasing processing with respect to object edge 56. As shown, representative triangle sets A, B 62, 60 refer to interpenetrating objects (i.e., having common x, y, z coordinates upon apparent intersection.)

FIG. 4 includes instructive software pseudo-code further illustrating interpenetration detection and pixel z-buffer tagging (Phase 1) 64 and oversampling-type antialiasing and pixel shading (Phase 2), according to one contemplated embodiment for implementing the present invention.

The foregoing described embodiments of the invention are provided as an illustration and description. It is not intended to limit the invention to the precise form described. Other variations and embodiments are possible in light of the above teaching, and it is thus intended that the scope of the invention not be limited by the detailed description, but rather by the claims as follow.

We claim:

1. A graphics signal processing method comprising:

processing a first graphics signal representing a geometry of a first three dimensional object in order to determine first z-values associated with each pixel location associated with the first three dimensional object;

processing a second graphics signal representing a geometry of a second three dimensional object in order to determine second z-values associated with each pixel location associated with the second three dimensional object;

comparing the first z-values associated with each pixel location associated with the first object with the second z-values associated with the corresponding pixel locations associated with the second three dimensional object in order to detect effectively an interpenetration of the first object and the second object at any pixel location; and applying an antialiasing or other functionally equivalent graphics signal processing technique to the corresponding pixel locations where an interpenetration of the first object and the second object is detected.

2. The method of claim 1 wherein the second z-values are provided in a fast memory.

3. The method of claim 2 wherein the first z-values are provided in a fast memory.

4. The method of claim 1 further comprising providing in a second memory an indication and the associated corresponding pixel locations where the first z-values and the second z-values are equal or substantially equivalent.

5. The method of claim 1 wherein the antialiasing comprises an over-sampling of the pixel.

6. The method of claim 1 wherein the antialiasing is an area based antialiasing.

7. The method of claim 1 wherein the antialiasing comprises an alpha edge antialiasing.

8. The method of claim 1 wherein the antialiasing comprises a blending antialiasing.

9. The method of claim 1 wherein the interpenetration is marked in a tag buffer.

10. The method of claim 9 further comprising antialiasing a pixel corresponding with the marked interpenetration.

11. The method of claim 10 wherein the antialiasing comprises an over-sampling of the pixel.

12. The method of claim 10 wherein the antialiasing is an area based antialiasing.

13. The method of claim 10 wherein the antialiasing comprises an alpha edge antialiasing.

14. The method of claim 10 wherein the antialiasing comprises a blending antialiasing.

15. A graphical signal processing system comprising a single source, a processor, and a memory, a signal processing method comprising steps:

generating a signal representing a first three-dimensional (3D) object;

processing by the signal processor the signal in order to detect any pixel locations representing an interpenetration between the first 3D object and a second 3D object represented in a memory, the signal processor detecting the pixel locations by determining when a first z-value associated with a corresponding pixel location associated with the second 3D object are in an interpenetration range;

storing by the processor in the memory a tag representing the pixel location where the interpenetration is detected; and antialiasing by the signal processor the pixel location where the interpenetration is detected according to an over-sampling, area-based, blending or alpha edge antialiasing.

16. A computer readable medium having embodied thereon a program, the program being executable by a machine to perform a method for processing a graphics signal, the method comprising:

processing a first graphics signal representing a geometry of a first three dimensional object in order to determine first z-values associated with each pixel location associated with the first three dimensional object;

processing a second graphics signal representing a geometry of a second three dimensional object in order to determine second z-values associated with each pixel location associated with the second three dimensional object;

comparing the first z-values associated with each pixel location associated with the first object with the second z-values associated with the corresponding pixel locations associated with the second three dimensional object in order to detect effectively an interpenetration of the first object and the second object at any pixel location; and applying an antialiasing or other functionally equivalent graphics signal processing technique to the corresponding pixel locations where an interpenetration of the first object and the second object is detected.

* * * * *